April 8, 1941.   C. KNOX, JR   2,237,562
TRAP SEAL FOR ELECTRIC CONDUIT LINES
Filed Sept. 9, 1939
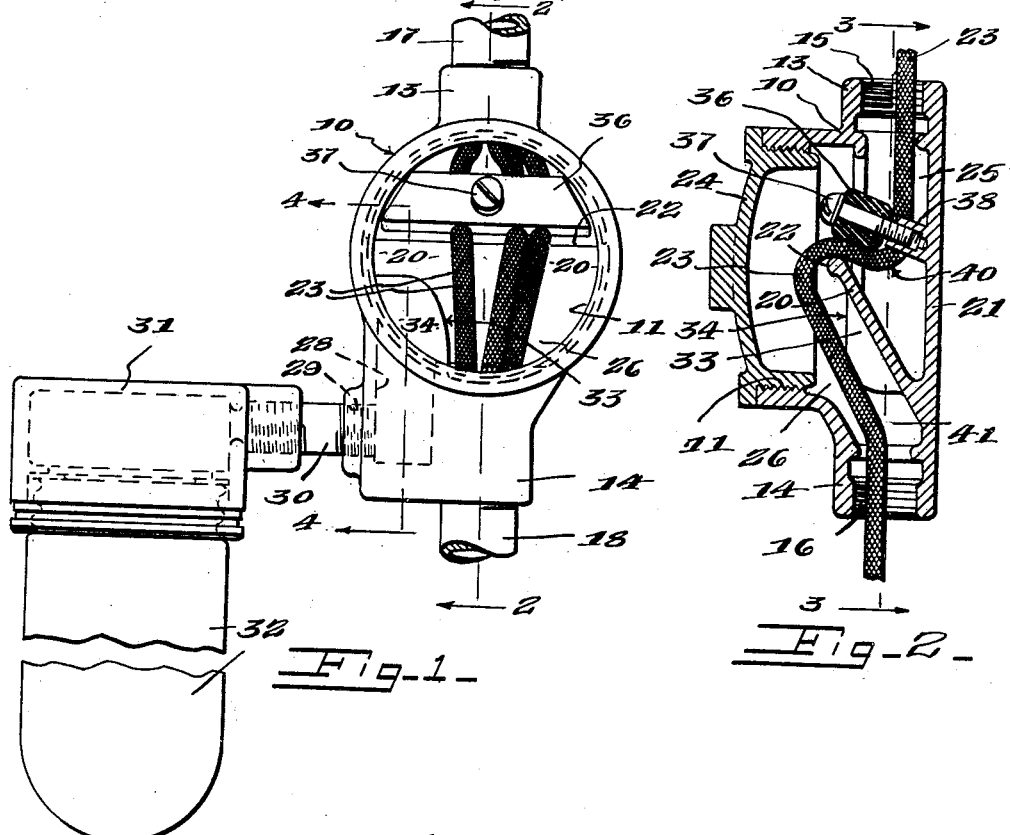
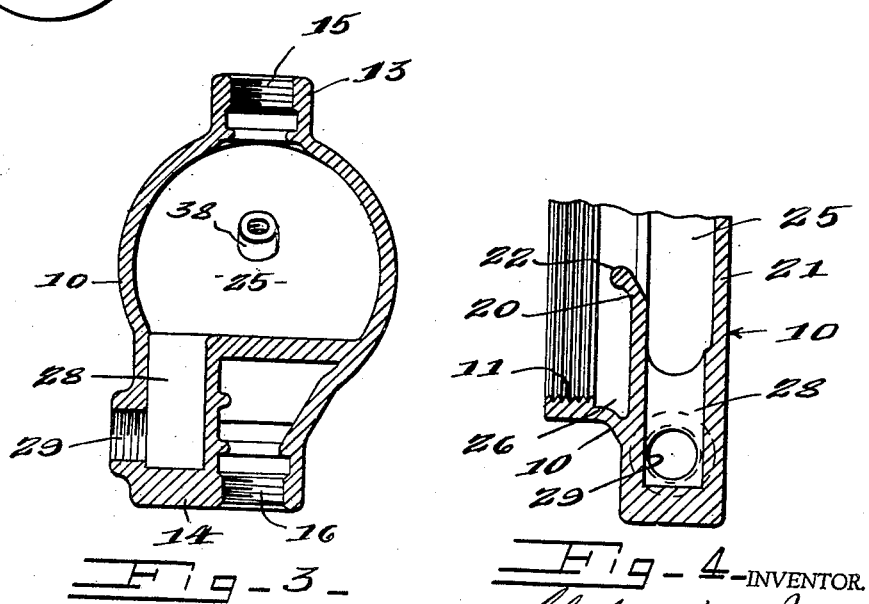
INVENTOR.
Charles Knox Jr.
BY Bodell & Thompson
ATTORNEYS.

Patented Apr. 8, 1941

2,237,562

UNITED STATES PATENT OFFICE 2,237,562

TRAP SEAL FOR ELECTRIC CONDUIT LINES

Charles Knox, Jr., Norwood, Pa., assignor to Crouse-Hinds Company, Syracuse, N. Y., a corporation of New York Application September 9, 1939, Serial No. 294,172

4 Claims. (Cl. 174—17)

This invention relates to a fitting for an electrical conduit line and more particularly to a fitting to be installed in the conduit line and which functions to collect moisture from the conduit entering the fitting and to prevent the passage of any moisture into the conduit extending from the fitting. Often circumstances are such that moisture will enter and collect in a portion or portions of the conduit installation. This moisture condenses and passes along the conduit line and is generally injurious to electrical apparatus installed in the system.

The general object of this invention is a fitting embodying a particularly simple and economical structure permitting the conductors in the conduit line to be conveniently installed in the line and properly arranged in the fitting, the fitting including the provision of means for trapping and collecting the condensed moisture and preventing the passage of any moisture into the rest of the conduit line.

The invention has as a further object means operable to arrange and maintain the conductors of the line in drip loop formation within the fitting, whereby any condensation passing along the conductors will discharge into the trap portion of the fitting.

The invention has as a further object a fitting as referred to embodying a construction by which the fitting, when installed, is vapor tight and the condensation is collected in a vapor tight receptacle.

The invention consists in the novel features and in the combinations and constructions hereinafter set forth and claimed.

In describing this invention, reference is had to the accompanying drawing in which like characters designate corresponding parts in all the views.

Figure 1 is a front elevational view of a fitting involving my invention with the cover removed from the work opening thereof and including a receptacle for the collection of the condensation accumulated in the trap.

Figure 2 is a vertical sectional view taken on line 2—2, Figure 1.

Figure 3 is a sectional view taken on lines 3—3, Figure 2.

Figure 4 is a fragmentary sectional view taken on lines 4—4, Figure 1.

The invention consists generally of a body or housing provided with a work opening in one side and a partition extending transversely within the body dividing the same into an entrance compartment and an outlet compartment. Each of these compartments is provided with a conduit receiving passage. The outlet compartment is provided with an additional passage to permit the drainage of the moisture collected in the entrance compartment and a vapor tight receptacle connected to said latter passage for the collection of moisture or condensation.

The invention further includes means arranged in the entrance compartment and cooperable to maintain a portion of the conductors in said compartment in drip loop formation, and the fitting is completed by a vapor tight closure detachably secured to the work opening.

The body 10 of the fitting is preferably of cast metal and is substantially cylindrical in formation being provided with a work opening 11 substantially coextensive with the interior of the fitting, whereby the wires or conductors may be conveniently handled during installation thereof in the conduit line and the arrangement of the conductors in the fittting. Opposite ends of the body are provided with hub portions 13, 14 and having conduit receiving passages 15, 16 respectively. The entrance conduit 17 is secured in the passage 15 and the outlet conduit 18 secured in the passage 16. The fitting is intended to be arranged in vertical position or connected into a vertical run or conduit and accordingly, the hub 13 is referred to as the upper end of the fitting, and the hub 14 as the lower end thereof. The housing is provided with a transversely extending partition 20.

In the embodiment of the invention illustrated, the partition 20 is inclined relative to the bottom wall 21 of the housing. The outer edge of the partition 20 is formed with a bead or roll to minimize chafing of the conductors 23 and is arranged outwardly from the bottom wall 21 and terminates a sufficient distance from the closure 24 to permit the conductors to be looped over the outer edge of the partition. The partition slants inwardly and downwardly to the bottom wall 21 and joins the same at a point in proximity to the outlet conduit receiving passage 16. The partition 20 extends entirely across the body with the outer edge 22 of the partition arranged substantially centrally of the cylindrical portion of the housing and divides the interior thereof into an entrance compartment 25 and an outlet compartment 26.

The lower hub 14 is of appreciable width and is formed with an axially extending passage 28 communicating with the entrance compartment 25 and with a drain pipe 29. The drain pipe is preferably threaded to receive a pipe 30 to the opposite end of which is secured a fitting 31 provided with a removable glass globe 32.

One side of the partition 20 is formed with an outwardly extending portion 33 having a top flat wall 34 forming the top wall of the passage 28.

The conductors 23, brought into the fitting through the conduit 17, are looped over the outer edge of the partition 20, as indicated in Figures 1 and 2, and that portion of the conductors arranged in the entrance compartment 25 is formed and maintained into a loop by a cleat 36 extending transversely of the compartment and being secured to the bottom wall 21 by a screw 37 extending through the cleat and threading into a boss 39 projecting outwardly from the bottom wall 21. The cleat 37 is so positioned relative to the outer edge of the partition 20 that the conductors 23 are formed into a loop of substantially S formation. A loop of this formation used in exterior wiring is known as a drip loop. The purpose of the loop is to effect a discharge of any moisture or condensation flowing downward on the conductors 23 into the trough formed by the inclined partition 20 and the contiguous portion of the bottom wall 21. In other words, the condensation will drip off from the conductors, as at 40, and any condensation flowing downward through the conduit 17 will likewise be collected in the trap formation from whence it flows into the passage 28 and is collected in the globe 32.

The lower end of the housing is provided with a convenient sealing well 41 and, if desired, this well may be filled with compound, as illustrated in Figure 2, to render the outlet run of the conduit line vapor tight at all times while the closure 24 is removed.

What I claim is:

1. A trap seal for an electric conduit line having electrical conductors arranged therein comprising a housing having a work opening in the top side thereof and a detachable closure for said opening, a partition arranged in the housing and extending outwardly from the bottom wall thereof toward said closure, said partition also extending transversely of the housing and dividing the same into an entrance compartment and an outlet compartment, said housing being also formed with a conduit receiving passage for each of said compartments, and a drain passage for said entrance compartment to permit the discharge of moisture collected therein, and means arranged in said entrance compartment and operable to maintain the conductors in said compartment in drip-loop formation with the drip-loop arranged intermediate the bottom wall of the housing and the outer edge of said partition.

2. A trap seal for an electrical conduit line having electrical conductors arranged therein comprising a housing having a work opening in the top side thereof and a detachable closure for said opening, a partition extending outwardly from the bottom wall of the housing with the outer edge of the partition spaced from the closure to permit the electrical conductor passing through the body to be looped over said partition, said partition also extending transversely of the housing and dividing the same into an entrance compartment and an outlet compartment, each of said compartments being provided with a conduit receiving passage, and said entrance compartment being also provided with a drain passage to permit the discharge of moisture collected therein, means arranged in said entrance compartment and cooperable with said partition to maintain the electrical conductors in said entrance compartment in drip-loop formation with the drip-loop arranged intermediate the bottom wall of the housing and the outer edge of said partition.

3. A trap seal for an electric conduit line having electrical conductors arranged therein comprising a housing formed with a work opening in the top side thereof and a detachable closure for said opening, a partition extending transversely of the housing and outwardly from the bottom wall thereof toward said closure, said partition dividing the housing into an entrance compartment and an outlet compartment, each of said compartments being provided with a conduit receiving passage, and said entrance compartment being provided with a drain passage to permit the discharge of moisture collected in said compartment, a cleat extending transversely of said entrance compartment, and screw means cooperable with said cleat and the housing to move the cleat toward the bottom wall of the body into engagement with the electrical conductors in the entrance compartment, and said cleat being cooperable with said partition to maintain said conductors in drip-loop formation with the drip-loop arranged intermediate the bottom wall of the housing and the outer edge of said partition.

4. A trap seal for an electric conduit line having electrical conductors arranged therein comprising a housing having a work opening in the top side thereof, and a detachable closure for said opening, a partition arranged in the housing and extending transversely thereof and dividing the same into an entrance compartment and an outlet compartment, said housing being also formed with a conduit receiving passage for each of said compartments, and a drain passage for said entrance compartment to permit the discharge of moisture collected therein, said partition inclining inwardly and downwardly from the outer edge thereof toward the conduit receiving passage of said outlet compartment, and means arranged in said entrance compartment and cooperable with said partition to maintain the conductors in said compartment in drip-loop formation with the drip-loop arranged intermediate the bottom wall of the housing and the outer edge of said partition.

CHARLES KNOX, Jr.